United States Patent
Hecht (10) Patent No.: US 9,403,214 B2
(45) Date of Patent: Aug. 2, 2016

(54) HARD METAL CUTTING TOOL HOLDER BLADE AND CUTTING TOOL HAVING SUCH HOLDER BLADE

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 472 days.

(21) Appl. No.: 14/011,425

(22) Filed: Aug. 27, 2013

(65) Prior Publication Data
US 2015/0063929 A1    Mar. 5, 2015

(51) Int. Cl.
| | |
|---|---|
| *B23B 5/02* | (2006.01) |
| *B23B 27/04* | (2006.01) |
| *B23B 27/16* | (2006.01) |
| *B23B 29/14* | (2006.01) |
| *B23B 27/08* | (2006.01) |
| *B23B 29/04* | (2006.01) |
| *B23C 5/22* | (2006.01) |

(52) U.S. Cl.
CPC ............. *B23B 27/04* (2013.01); *B23B 27/086* (2013.01); *B23B 27/1625* (2013.01); *B23B 29/043* (2013.01); *B23B 29/14* (2013.01); *B23B 2200/0423* (2013.01); *B23B 2200/08* (2013.01); *B23B 2200/165* (2013.01); *B23B 2205/02* (2013.01); *Y10T 407/2202* (2015.01)

(58) Field of Classification Search
CPC ...... B23B 29/04; B23B 2205/02; B23B 27/04
See application file for complete search history.

(56) References Cited

U.S. PATENT DOCUMENTS

| | | | | |
|---|---|---|---|---|
| 3,543,363 A | * | 12/1970 | Diemond | B23B 27/04 407/101 |
| 4,604,004 A | * | 8/1986 | Armbrust | B23B 27/045 407/110 |

(Continued)

FOREIGN PATENT DOCUMENTS

| | | |
|---|---|---|
| JP | H04 112705 U | 9/1992 |
| JP | H08 215904 A | 8/1996 |

OTHER PUBLICATIONS

International Search Report dated Oct. 21, 2014 issued in PCT counterpart application (No. PCT/IL2014/050565).

*Primary Examiner* — Will Fridie, Jr.
(74) *Attorney, Agent, or Firm* — Womble Carlyle (57) ABSTRACT

A cutting tool holder blade is formed of hard metal, having a front plane, a perpendicular mid-plane. An insert pocket of the holder blade has a base jaw and a clamping jaw resiliently connected to the base jaw in a unitary one piece construction. The base jaw has a base jaw abutment surface and the clamping jaw has a clamping surface facing opposite the base jaw abutment surface, and an insert stop surface. A curved inner surface extends from the base jaw abutment surface towards and along the clamping jaw, the curved inner surface having a front extremity portion. The clamping jaw is narrowed down adjacent the front extremity portion, such that the clamping surface overhangs the front extremity portion of the curved inner surface, in a direction towards the base jaw and away from the front plane. The holder blade may be formed of cemented carbide.

17 Claims, 4 Drawing Sheets

(56) References Cited

U.S. PATENT DOCUMENTS

| | | | |
|---|---|---|---|
| 4,909,677 A * | 3/1990 | Noguchi | B23B 27/04 407/110 |
| 5,054,967 A | 10/1991 | Noguchi et al. | |
| 5,150,992 A * | 9/1992 | Friedmann | B23B 27/045 407/110 |
| 5,697,271 A * | 12/1997 | Friedman | B23B 27/04 407/109 |
| 6,113,319 A | 9/2000 | Hansson et al. | |
| 6,702,529 B1 * | 3/2004 | Tagstrom | B12B 27/04 407/110 |
| 7,163,361 B2 | 1/2007 | Hecht | |
| 7,326,007 B2 | 2/2008 | Hecht | |
| 7,578,640 B2 * | 8/2009 | Hecht | B23B 27/16 407/103 |
| 8,647,029 B2 * | 2/2014 | Hecht | B23B 27/045 407/107 |
| 2011/0158756 A1 | 6/2011 | Athad | |

\* cited by examiner

HARD METAL CUTTING TOOL HOLDER BLADE AND CUTTING TOOL HAVING SUCH HOLDER BLADE

FIELD OF THE INVENTION

The present invention relates to a cutting tool holder blade and a cutting tool therefor, in general, and to a cutting tool holder blade made of hard metal, in particular.

BACKGROUND OF THE INVENTION

Metal cutting tools used in turning operations include cutting inserts which are removably secured in a tool holder blade. The cutting inserts are usually formed of a suitably hard material, i.e., cemented carbide, where the tool holder may be formed of a less hard material (e.g., steel) or of a hard material (e.g., hard metal), and is reusable following the disposal of a worn or damaged cutting insert.

Cutting tool holders of the holder blade type have a portion for receiving and holding a cutting insert. The portion for receiving the cutting insert may have an insert pocket with a resilient clamping part, which is flexibly moveable when the cutting insert is placed inside the insert pocket. Cutting tool holder blades as mentioned above are disclosed, for example, in the following patent publications: U.S. Pat. No. 4,604,004, U.S. Pat. No. 4,909,677, U.S. Pat. No. 5,054,967, U.S. Pat. No. 7,163,361 and U.S. Pat. No. 7,578,640.

SUMMARY OF THE INVENTION

In accordance with the subject matter of the present application, there is provided a cutting tool holder blade having a longitudinal mid-axis lying on a mid-plane, the cutting tool holder blade comprising:

at least one insert clamping portion with a front plane perpendicular to the mid-plane, the insert clamping portion having at least one insert pocket, the insert pocket comprising:
  a base jaw having a base jaw abutment surface;
  a clamping jaw resiliently connected to the base jaw in a unitary one piece construction, the clamping jaw having a clamping surface facing opposite the base jaw abutment surface and an insert stop surface; and
  a curved inner surface extending from the base jaw abutment surface towards
and along the clamping jaw, the curved inner surface having a front extremity portion,
wherein:
  the holder blade is formed of hard metal, and
  a first minimum longitudinal distance between the front extremity portion and the front plane is smaller than a second minimum longitudinal distance between the clamping surface and the front plane.

In some embodiments of the present invention, the cutting tool holder blade as described above is mirror symmetric about the mid-plane, the insert clamping portion having two insert pockets located on opposite sides of the mid-plane, the curved inner surface has an inner extremity portion, spaced apart from the front extremity portion, with a minimum transverse distance extending between the inner extremity portions of both insert pockets in the same insert clamping portion, a third longitudinal distance extends between the inner extremity portion of each insert pocket and the front plane, and the minimum transverse distance is greater than the third longitudinal distance.

In accordance with another aspect of the subject matter of the present application, there is provided a cutting tool comprising:
  a cutting tool holder blade as described above, and
  a cutting insert resiliently retained in the at least one insert pocket of the cutting tool holder blade.

The cutting insert may comprise:
  a cutting portion and a locating portion, the cutting portion having a cutting edge formed at the intersection of a rake surface and a relief surface;
  an upper surface, a lower surface and a peripheral side surface extending therebetween, the locating portion extending from the cutting portion away from the upper surface, the locating portion having opposing forward and rear locating surfaces, the forward locating surface being located in the lower surface, the peripheral side surface comprising:
    opposing forward and rear surfaces and opposing side surfaces extending between the forward and rear surfaces, the relief surface being located in the forward surface, the rake surface being located in the upper surface, and the rear locating surface being located in the rear surface; and
  a lower locating surface located in the lower surface and opposing the upper surface, and extending between the forward surface and the forward locating surface.

In such a cutting tool, the base jaw abutment surface of the base jaw abuts the rear surface of the cutting insert, the clamping surface of the clamping jaw abuts the forward locating surface of the cutting insert, and the insert stop surface of the clamping jaw abuts the lower locating surface of the cutting insert.

In accordance with yet another aspect of the subject matter of the present application, there is provided a cutting tool holder blade having opposite ends and a longitudinal mid-axis lying on a mid plane and extending between the opposite ends, the cutting tool holder blade comprising:

at least one insert clamping portion having at least one insert pocket, the insert pocket comprising:
  a base jaw having a base jaw abutment surface;
  a clamping jaw resiliently connected to the base jaw in a unitary one piece construction, the clamping jaw having a clamping surface facing opposite the base jaw abutment surface and an insert stop surface; and
  a curved inner surface extending from the base jaw abutment surface towards and along the clamping jaw, the curved inner surface having a front extremity portion,
wherein:
  the holder blade is formed of hard metal;
  the at least one insert clamping portion has a front plane extending perpendicular to the mid-plane, the front plane passing through a forwardmost portion of a front surface of the at least one insert clamping portion; and
  the clamping surface overhangs the front extremity portion of the curved inner surface, in a direction towards the base jaw and away from the front plane.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
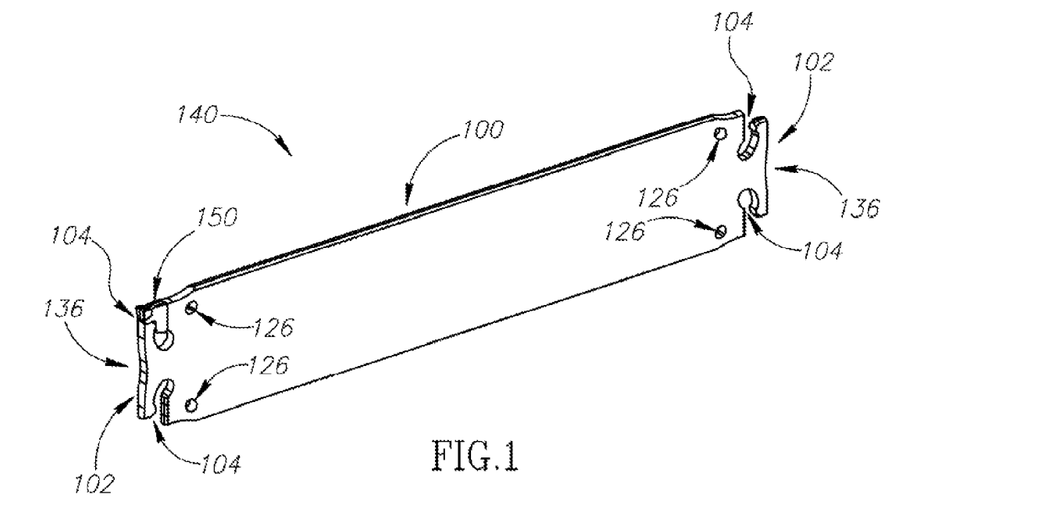
FIG. 1 is a schematic illustration of a cutting tool according to one embodiment of the present invention.

Reference is now made to FIG. 1, depicting a cutting tool 140 according to a first embodiment of the present invention. The cutting tool 140 is a turning cutting tool having a cutting tool holder blade 100 and a cutting insert 150 retained therein. The cutting tool holder blade 100 is an elongated rectangular holder blade having opposite ends 136 and four identical insert pockets 104, one in each corner of the rectangle.

Reference is further made to FIGS. 2-6, depicting various views of the cutting tool 140 and its cutting tool holder blade 100. The cutting tool holder blade 100 is formed of hard metal, such as cemented carbide. A resilient clamping arrangement formed in a hard metal construction may tend to crack or break under clamping forces, due to the large modulus of elasticity of the hard metal. In comparison, the modulus of elasticity of cemented carbide is nearly three times larger than the modulus of elasticity of steel. Therefore, when a hard metal resilient clamping arrangement is used, it is desirable to have higher elasticity which would withstand the elastic deformation caused by resilient clamping of a cutting insert in a cutting tool.

As mentioned above, the cutting tool 140 includes the cutting tool holder blade 100, and a cutting insert 150 resiliently retained in one of the insert pockets 104 of the cutting tool holder blade 100. The cutting tool holder blade 100 has a longitudinal mid-axis A lying on a mid-plane P and extending between the opposite ends 136. The cutting tool holder blade 100 comprises at least one insert clamping portion 102. The insert clamping portion 102 has a front surface 122 defining a front plane F perpendicular to the mid-plane P. In particular, the front plane F extends perpendicular to the mid-axis A and passes through the forwardmost portion of the front surface 122.

Each insert clamping portion 102 has at least one insert pocket 104. Each insert pocket 104 includes a base jaw 106 and a clamping jaw 110. The base jaw 106 has a base jaw abutment surface 108. The clamping jaw 110 is resiliently connected to the base jaw 106 in a unitary one piece construction. The clamping jaw 110 has a clamping surface 112 facing opposite the base jaw abutment surface 108 and an insert stop surface 114 facing in a direction transverse to the clamping surface 112. In a side view of the cutting tool holder blade 100, taken along the mid-axis A, the insert stop surface 114 extends substantially parallel to the mid-axis A. An insert receiving slot 104a defined between the clamping surface 112 and the base jaw abutment surface 108 has an insert insertion direction DINS which is generally parallel to the front plane F and generally perpendicular to both the holder blade's longitudinal mid-axis A and the mid-plane P.

A curved inner surface 116 extends from the base jaw abutment surface 108 towards the clamping jaw 110, extending further along the clamping jaw 110 towards the insert stop surface 114. The curved inner surface 116 has a front extremity portion 118, which is spaced apart from the front plane F by a first minimum longitudinal distance D1 (i.e., in a direction parallel to the mid-axis A). The first minimum longitudinal distance D1 is the shortest longitudinal distance between any portion of the curved inner surface 116 and the front plane F. At a point closest to the mid-plane P, the curved inner surface 116 has an inner extremity portion 120, which is spaced apart from the front extremity portion 118.

Figure 2:
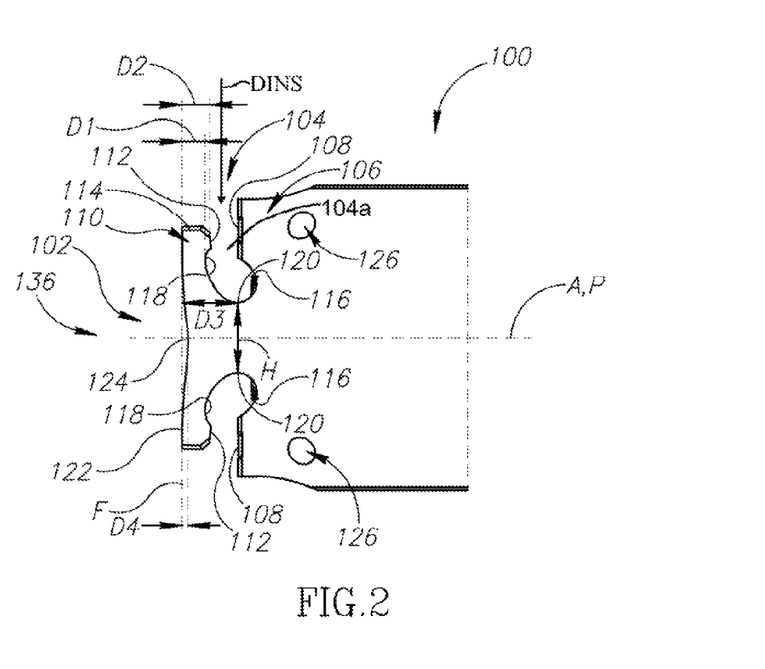
FIG. 2 is a partial detail side view of the cutting tool holder blade of FIG. 1.

A second minimum longitudinal distance D2 is the minimum distance between the clamping surface 112 and the front plane F. The second minimum longitudinal distance D2 is the shortest longitudinal distance between any portion of the clamping surface 112 and the front plane F. In some cases, e.g., as shown in FIG. 2, the clamping surface 112 is angled with respect to the mid-plane P, in order to form a wedge formation with the base jaw abutment surface 108. In such case, the second minimum longitudinal distance D2 extends between the front plane F and the end of the clamping surface 112, which is closest to the insert stop surface 114.

Figure 3:
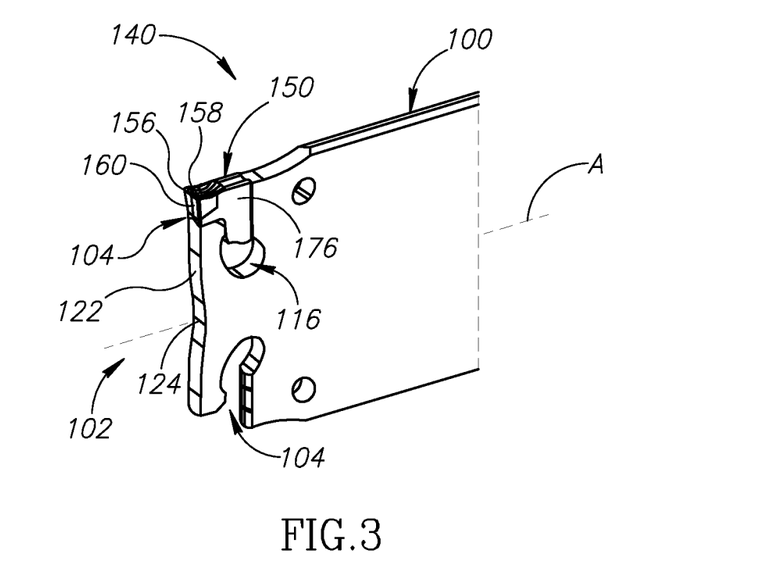
FIG. 3 is a detail view of a portion of the cutting tool of FIG. 1.
Figure 4:
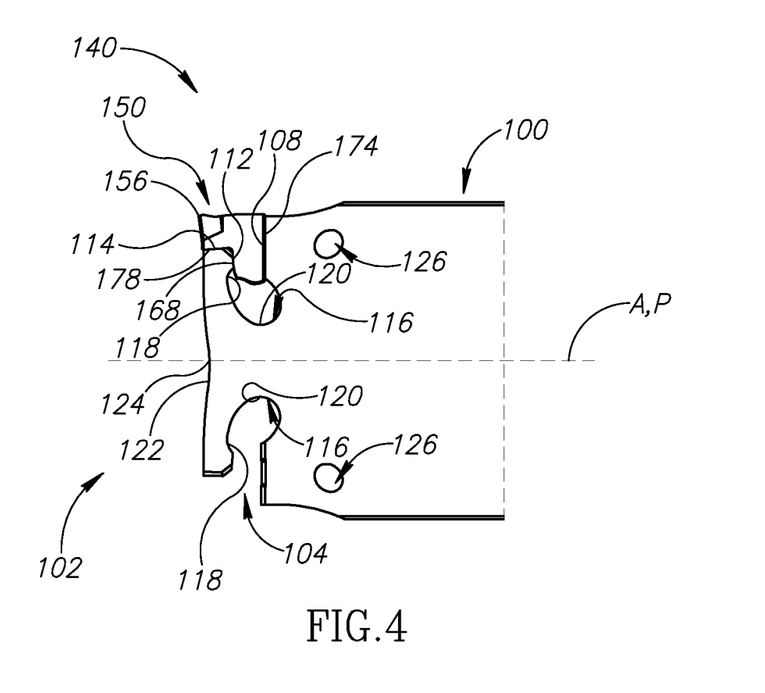
FIG. 4 is a side view of the portion of the cutting tool of FIG. 1.

According to the present invention, the first minimum longitudinal distance D1 is smaller than the second minimum longitudinal distance D2. In other words, the clamping jaw 110 is narrower, in the longitudinal direction, adjacent to the front extremity portion 118 of the curved inner surface 116, than at the clamping surface 112. Stated differently, the clamping surface 112 overhangs the front extremity portion 118 of the curved inner surface 116, in a direction towards the base jaw 106 and away from the front plane F. And as seen in FIG. 3, this overhang is present even when the cutting insert 150 is retained in the insert pocket 104. In addition, the retained cutting insert 150 is spaced apart from the front extremity portion 118 of the curved inner surface 116. In this manner, the clamping jaw 110 has higher elasticity when the cutting insert 150 is inserted into the insert pocket 104. Since the cutting tool holder blade 100 is formed of hard metal, it is desirable to allow the clamping jaw 110 to withstand elastic deformation as much as possible, while preventing breakage and cracks in the holder blade 100, e.g. adjacent the clamping jaw 110.

It would be appreciated that any one of the base jaw abutment surface 108, the clamping surface 112 and the insert stop surface 114, may be formed as a V-shaped surface. In order to form a V-shaped surface, that surface must be ground in the desired direction. Making the first minimum longitudinal distance D1 smaller than the second minimum longitudinal distance D2 allows for safer grinding of the base jaw abutment surface 108. When a grinding wheel is entered into the insert pocket 104 in order to grind the base jaw abutment surface 108, there is sufficient space in the front extremity portion 118 of the curved inner surface 116, for the grinding wheel to avoid contact with the clamping jaw 110 at the curved inner surface 116. In this manner, possible damage to the clamping jaw 110 by the grinding wheel may be avoided.

According to the embodiment shown in FIGS. 1-6, the cutting tool holder blade 100 is mirror symmetric about the mid-plane P. Thus, the insert clamping portion 102 has two identical mirrored insert pockets 104 located on opposite sides of the mid-plane P. The inner extremity portions 120 of the curved inner surface 116 of both insert pockets 104 in the same insert clamping portion 102 are spaced apart by a minimum transverse distance H, as indicated in FIG. 2. The minimum transverse distance H is the shortest transverse distance between any portions of the curved inner surfaces 116 of both insert pockets 104 (i.e., in a direction perpendicular to the mid-plane P). A third longitudinal distance D3 (FIG. 2) extends between the inner extremity portion 120 and the front plane F. According to this embodiment of the present invention, the minimum transverse distance H is greater than the third longitudinal distance D3. In a particular case, the minimum transverse distance H may be at least twice the third longitudinal distance D3.

The front surface 122 may have a central indented portion 124, curving away from the front plane F into the cutting tool holder blade. A fourth longitudinal distance D4 extends between the innermost portion of the indented portion 124 and the front plane F (FIG. 2). The fourth longitudinal distance D4 is the largest longitudinal distance between any portion of the front surface 122 and the front plane F. This curved indent in the front surface 122 adjacent the resilient clamping jaws 110 narrows the clamping jaws 110 in the vicinity of the mid-plane P. In this manner, each of the clamping jaws 110 is further flexible, and amenable to elastic deformation when clamping the cutting insert 150.

Figure 5:
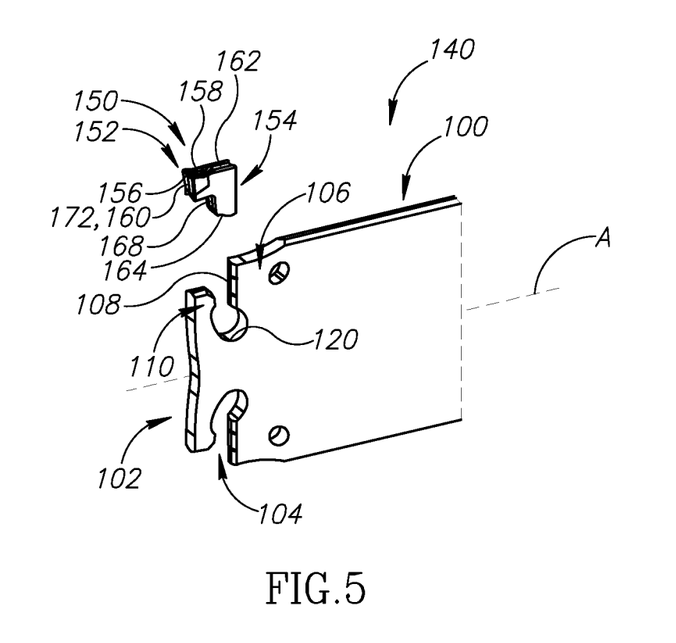
FIG. 5 is a first exploded view of the portion of the cutting tool shown in FIG. 3.
Figure 6:
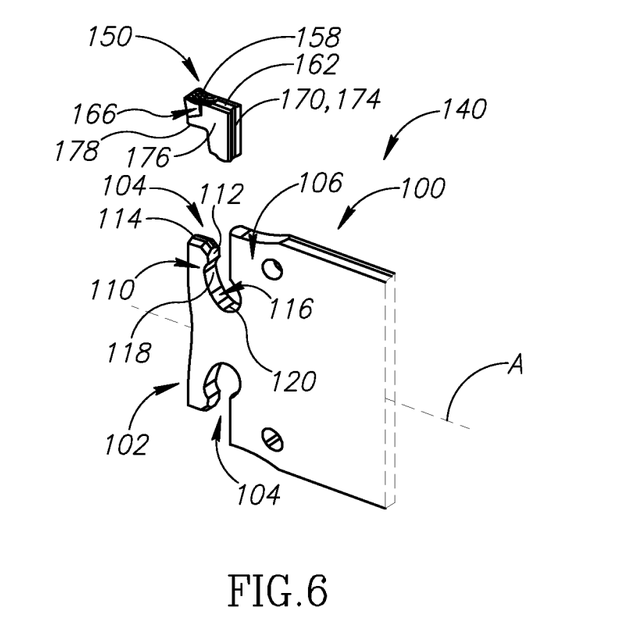
FIG. 6 is a second exploded view of the portion of the cutting tool shown in FIG. 3.

With particular reference to FIGS. 5 and 6, the cutting insert 150 is mounted into the insert pocket 104, for example, from its position shown in FIGS. 5 and 6, towards the mid-plane P, until reaching the mounted position shown in FIG. 1. The cutting insert 150 has a cutting portion 152 and a locating portion 154. The cutting portion 152 has a cutting edge 156 formed at the intersection of a rake surface 158 and a relief surface 160. The cutting insert 150 further has an upper surface 162, a lower surface 164 and a peripheral side surface 166 extending therebetween.

The locating portion 154 extends from the cutting portion 152 away from the upper surface 162. The locating portion 154 has opposing forward and rear locating surfaces 168, 170, with the forward locating surface 168 located in the lower surface 164. The peripheral side surface 166 includes opposing forward and rear surfaces 172, 174 and opposing side surfaces 176 extending therebetween. The relief surface 160 is located in the forward surface 172, and the rake surface 158 is located in the upper surface 162. The rear locating surface 170 is located in the rear surface 174. In addition, a lower locating surface 178 is located in the lower surface 164 and opposing the upper surface 162, and extending between the forward surface 172 and the forward locating surface 168.

When the cutting insert 150 is mounted into the insert pocket 104, the base jaw abutment surface 108 of the base jaw 106 abuts the rear surface 174 of the cutting insert 150. The clamping surface 112 of the clamping jaw 110 abuts the forward locating surface 168 of the cutting insert 150. The insert stop surface 114 of the clamping jaw 106 abuts the lower locating surface 178 of the cutting insert 150.

Figure 7:
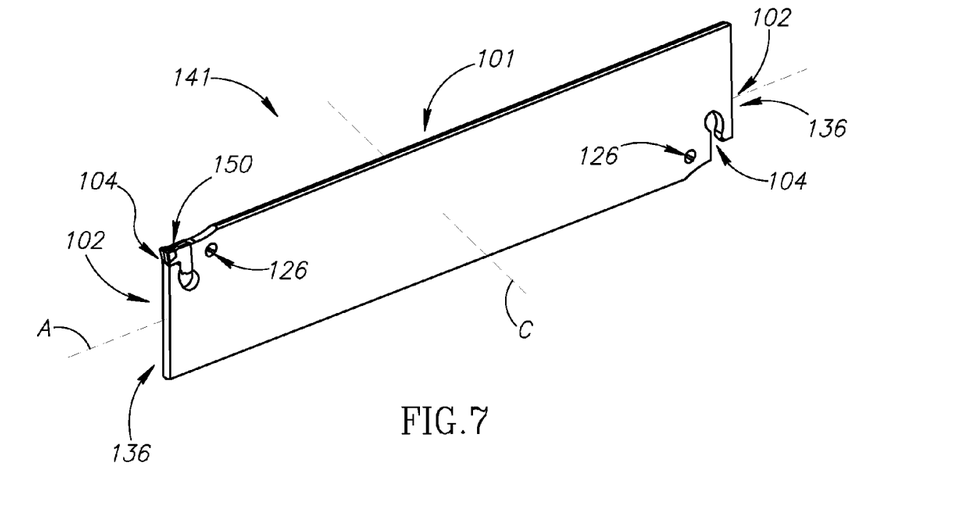
FIG. 7 is a schematic illustration of a cutting tool according to another embodiment of the present invention.
Figure 8:
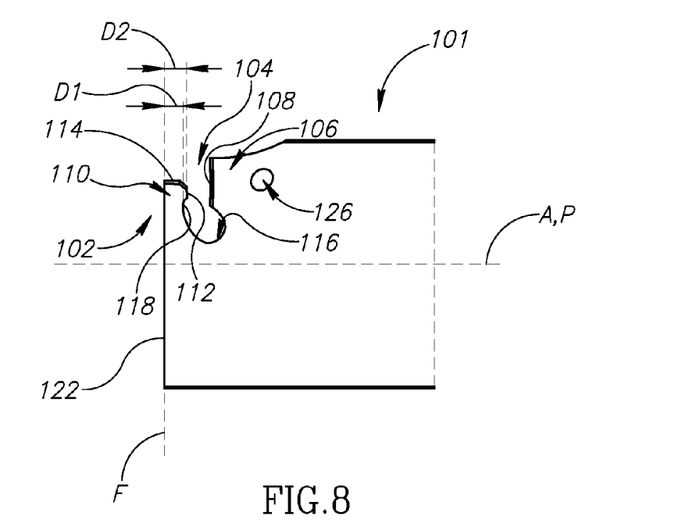
FIG. 8 is a detail side view of the cutting tool holder blade of FIG. 7.

With reference to FIGS. 7 and 8, another cutting tool 141 is shown, according to a second embodiment of the present invention, including a cutting tool holder blade 101 and a cutting insert 150. The cutting tool holder blade 101 is similar to the cutting tool holder blade 100, having only two insert pockets 104, located in opposite corners of the rectangle. As such, the holder blade 101 has 180° rotational symmetry about a central axis C which is perpendicular to the longitudinal axis A and lies on the mid-plane P, but lacks mirror symmetry about the mid-plane P. As indicated in FIG. 8, for each of the insert pockets 104 of the cutting tool holder blade 101, the first minimum longitudinal distance D1 is smaller than the second minimum longitudinal distance D2, as in the cutting tool holder blade 100.

The cutting tool holder blade 100, 101 may further have a through hole 126 adjacent each of the insert pockets 104. Each through hole 126 is adapted to receive a respective member of an actuating key, which serves to advance the cutting insert 150 into and out of the insert pocket 104. Another member of the actuating key is configured to fit simultaneously either into the insert pocket 104, adjacent the curved inner surface 116, or above the upper surface 162 of the cutting insert 150. The actuating key is configured to advance the cutting insert 150 into the insert pocket 104, when the other member is located above the upper surface 162 and the key is rotated in a first direction, and to extract the cutting insert 150, when the other member is located adjacent the curved inner surface 116 and the key is rotated in an opposite direction.

It would be appreciated that since the cutting tool holder blade 100, 101 is formed of hard metal, it is more durable than steel, for example, in terms of durability to heat during metal cutting. Since hard metal is durable to the heat formed during metal cutting, there is no need for an external or internal arrangement for applying coolant fluid to the cutting area of the cutting tool, making the holder blade 100, 101 less complicated and easier to manufacture.

In addition, a cutting tool having a hard metal holder blade, such as holder blade 100, 101 is more stabile and less prone to vibrate during metal cutting operations. This improves the cutting tool life and total possible time of operation. When the cutting tool holder blade is more stabile, it may also provide for deeper turning depth of the turning cutting tool.

In the cutting tool 140, 141, the cutting insert 150 may be replaced when worn, or after a predetermined period of operation time. It would be appreciated that in the hard metal cutting tool holder blade 100, 101, the resilience and elasticity of the clamping jaw 110 is unlikely to be impaired over time and repeated use (i.e., which may happen in a steel holder blade, for example).

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool holder blade (100, 101) having opposite ends (136) and a longitudinal mid-axis (A) lying on a mid-plane (P) and extending between the opposite ends (136), the cutting tool holder blade (100, 101) comprising:

at least one insert clamping portion (102) with a front plane (F) perpendicular to the mid-plane (P), the insert clamping portion (102) having at least one insert pocket (104), the insert pocket (104) comprising:

a base jaw (106) having a base jaw abutment surface (108);

a clamping jaw (110) resiliently connected to the base jaw in a unitary one-piece construction, the clamping jaw (110) having a clamping surface (112) facing opposite the base jaw abutment surface (108) and an insert stop surface (114);

a curved inner surface (116) extending from the base jaw abutment surface (108) towards and along the clamping jaw (110), the curved inner surface (116) having a front extremity portion (118); and an insert receiving slot (104a) defined between the clamping surface (112) and the base jaw abutment surface (108) and having an insert insertion direction (DINS) which is generally parallel to the front plane (F) and generally perpendicular to both the longitudinal mid-axis (A) and the mid-plane (P), wherein:
the holder blade (100, 101) is formed of hard metal, and
a first minimum longitudinal distance (D1) between the front extremity portion (118) and the front plane (F) is smaller than a second minimum longitudinal distance (D2) between the clamping surface (112) and the front plane (F).

2. The cutting tool holder blade (100) according to claim 1, wherein:
the cutting tool holder blade (100) is mirror-symmetric about the mid-plane (P) with the at least one insert clamping portion (102) having two insert pockets (104) located on opposite sides of the mid-plane (P),
the curved inner surface (116) has an inner extremity portion (120), spaced apart from the front extremity portion (118), with a minimum transverse distance (H) extending between the inner extremity portions (120) of both insert pockets (104) in the same insert clamping portion (102),
a third longitudinal distance (D3) extends between the inner extremity portion (120) of each insert pocket (104) and the front plane (F), and
the minimum transverse distance (H) is greater than the third longitudinal distance (D3).

3. The cutting tool holder blade (100) according to claim 2, wherein the minimum transverse distance (H) is at least twice the third longitudinal distance (D3).

4. The cutting tool holder blade (100) according to claim 2, wherein a front surface (122) extends away from the insert pocket (104) along the insert clamping portion (102), the front surface (122) having a central indented portion (124) indented away from the front plane (F) into the cutting tool holder blade.

5. The cutting tool holder blade (100, 101) according to claim 1, wherein the cutting tool holder blade (100, 101) is formed of cemented carbide.

6. The cutting tool holder blade (101) according to claim 1, wherein:
the holder blade has 180° rotational symmetry about a central axis (C) perpendicular to the longitudinal axis (A) and lies on the mid-plane (P), and
the holder blade lacks mirror symmetry about the mid-plane (P).

7. A cutting tool (140, 141) comprising:
a cutting tool holder blade (100, 101) according to claim 1, and
a cutting insert (150) resiliently retained in the at least one insert pocket (104) of the cutting tool holder blade (100, 101).

8. The cutting tool (140, 141) according to claim 7, wherein:
the cutting insert (150) comprises:
a cutting portion (152) and a locating portion (154), the cutting portion (152) having a cutting edge (156) formed at the intersection of a rake surface (158) and a relief surface (160);
an upper surface (162), a lower surface (164) and a peripheral side surface (166) extending therebetween, the locating portion (154) extending from the cutting portion (152) away from the upper surface (162), the locating portion (154) having opposing forward and rear locating surfaces (168, 170), the forward locating surface (168) being located in the lower surface (164), the peripheral side surface (166) comprising:
opposing forward and rear surfaces (172, 174) and opposing side surfaces (176) extending between the forward and rear surfaces (172, 174), the relief surface (160) being located in the forward surface (172), the rake surface (158) being located in the upper surface (162), and the rear locating surface (170) being located in the rear surface (174); and
a lower locating surface (178) located in the lower surface (164) and opposing the upper surface (162), and extending between the forward surface (172) and the forward locating surface (168).

9. The cutting tool (140, 141) according to claim 8, wherein:
the base jaw abutment surface (108) of the base jaw (106) abuts the rear surface (174) of the cutting insert (150),
the clamping surface (112) of the clamping jaw (110) abuts the forward locating surface (168) of the cutting insert (150), and
the insert stop surface (114) of the clamping jaw (106) abuts the lower locating surface (178) of the cutting insert (150).

10. The cutting tool (140, 141) according to claim 7, wherein:
both the cutting tool holder blade (100, 101) and the cutting insert (150) are formed of cemented carbide; and
the cutting insert (150) is spaced apart from the front extremity portion (118) of the curved inner surface (116).

11. A cutting tool holder blade (100, 101) having opposite ends (136) and a longitudinal mid-axis (A) lying on a mid-plane (P) and extending between the opposite ends (136), the cutting tool holder blade (100, 101) comprising:
at least one insert clamping portion (102) having at least one insert pocket (104), the insert pocket (104) comprising:
a base jaw (106) having a base jaw abutment surface (108);
a clamping jaw (110) resiliently connected to the base jaw in a unitary one-piece construction, the clamping jaw (110) having a clamping surface (112) facing opposite the base jaw abutment surface (108) and an insert stop surface (114);
a curved inner surface (116) extending from the base jaw abutment surface (108) towards and along the clamping jaw (110), the curved inner surface (116) having a front extremity portion (118);
an insert receiving slot (104a) defined between the clamping surface (112) and the base jaw abutment surface (108),
wherein:
the holder blade (100, 101) is formed of hard metal;
the at least one insert clamping portion (102) has a front plane (F) extending perpendicular to the mid-plane (P), the front plane (F) passing through a forwardmost portion of a front surface (122) of the at least one insert clamping portion (102);
the clamping surface (112) overhangs the front extremity portion (118) of the curved inner surface (116), in a direction towards the base jaw (106) and away from the front plane (F); and
the insert receiving (104) has an insert insertion direction (DINS) which is generally parallel to the front plane (F) and generally perpendicular to both the longitudinal mid-axis (A) and the mid-plane (P).

12. The cutting tool holder blade (100) according to claim 11, wherein:
- the cutting tool holder blade (100) is mirror-symmetric about the mid-plane (P) with the at least one insert clamping portion (102) having two insert pockets (104) located on opposite sides of the mid-plane (P),
- the curved inner surface (116) has an inner extremity portion (120), spaced apart from the front extremity portion (118), with a minimum transverse distance (H) extending between the inner extremity portions (120) of both insert pockets (104) in the same insert clamping portion (102),
- a third longitudinal distance (D3) extends between the inner extremity portion (120) of each insert pocket (104) and the front plane (F), and
- the minimum transverse distance (H) is greater than the third longitudinal distance (D3).

13. The cutting tool holder blade (100) according to claim 12, wherein the minimum transverse distance (H) is at least twice the third longitudinal distance (D3).

14. The cutting tool holder blade (100) according to claim 12, wherein the front surface (122) has a central indented portion (124) indented away from the front plane (F) into the cutting tool holder blade.

15. The cutting tool holder blade (100, 101) according to claim 11, wherein the hard metal comprises cemented carbide.

16. The cutting tool holder blade (101) according to claim 11, wherein:
- the holder blade has 180° rotational symmetry about a central axis (C) perpendicular to the longitudinal axis (A) and lying on the mid-plane (P), and
- the holder blade lacks mirror symmetry about the mid-plane (P).

17. A cutting tool (140, 141) comprising:
- a cutting tool holder blade (100, 101) according to claim 11, and
- a cutting insert (150) resiliently retained in the at least one insert pocket (104) of the cutting tool holder blade (100, 101); wherein:
- both the cutting tool holder blade (100, 101) and the cutting insert (150) are formed of cemented carbide; and
- the cutting insert (150) is spaced apart from the front extremity portion (118) of the curved inner surface (116).

* * * * *